United States Patent
Rozkowski

(10) Patent No.: US 6,588,137 B1
(45) Date of Patent: Jul. 8, 2003

(54) ICE FISHING JIGGING APPARATUS AND METHOD

(75) Inventor: John Rozkowski, Sterling Heights, MI (US)

(73) Assignee: Rozko, Inc., Warren, MI (US)

( * ) Notice: Subject to any disclaimer, the term of this patent is extended or adjusted under 35 U.S.C. 154(b) by 0 days.

(21) Appl. No.: 09/657,158

(22) Filed: Sep. 7, 2000

(51) Int. Cl.⁷ .................. A01K 85/01; A01K 93/00; A01K 97/12
(52) U.S. Cl. .................................. 43/17; 43/45
(58) Field of Search .................. 43/17, 45, 19; 242/250

(56) References Cited

U.S. PATENT DOCUMENTS

| | | | |
|---|---|---|---|
| 2,643,478 A * 6/1953 | Paulsen ............... 43/19.2 |
| 2,758,407 A * 8/1956 | Speidell ............... 43/19.2 |
| 2,783,575 A * 3/1957 | Housell, Sr. ........... 43/16 |
| 3,365,833 A * 1/1968 | Christiansen ........... 43/15 |
| 3,550,302 A * 12/1970 | Creviston et al. ....... 248/158 |
| 3,568,352 A * 3/1971 | Hill .................. 248/158 |
| 3,691,668 A * 9/1972 | Strebig ............... 43/19.2 |
| 3,739,514 A * 6/1973 | Odney ................ 43/17 |
| 4,077,149 A * 3/1978 | Enquist ............... 43/19.2 |
| 4,197,668 A * 4/1980 | McKinsey ............. 43/15 |
| 4,251,939 A * 2/1981 | Tiede ................. 43/19.2 |
| 4,280,295 A * 7/1981 | Hoeving et al. ......... 43/19.2 |
| 4,373,287 A * 2/1983 | Grahl ................. 43/17 |
| 4,399,631 A * 8/1983 | Smith ................. 43/17 |
| 4,420,900 A * 12/1983 | Nestor ................ 43/17 |
| 4,550,519 A * 11/1985 | Simmons et al. ........ 43/15 |
| 4,597,215 A * 7/1986 | Otremba ............... 43/19.2 |
| 4,603,499 A * 8/1986 | Simborski ............. 43/19.2 |
| 4,627,186 A * 12/1986 | Wang ................. 43/16 |
| 4,634,072 A * 1/1987 | Stealy ................ 242/223 |
| 4,642,930 A * 2/1987 | Graf .................. 43/17 |
| 4,660,317 A * 4/1987 | Evans ................. 43/19.2 |
| 4,680,885 A * 7/1987 | Lindell et al. ......... 43/19.2 |
| 4,704,816 A * 11/1987 | Kuchar ............... 43/17 |
| 4,752,878 A * 6/1988 | Sigurdsson et al. ...... 43/15 |
| 4,811,514 A * 3/1989 | Jordan ................ 43/15 |
| 4,823,493 A * 4/1989 | Gray .................. 43/15 |
| 4,890,409 A * 1/1990 | Morgan et al. ......... 43/15 |
| 4,924,617 A * 5/1990 | Parent ................ 43/15 |
| 4,932,151 A * 6/1990 | Cicha ................. 43/19.2 |
| 4,951,411 A * 8/1990 | Ecker ................ 43/19.2 |
| 5,010,678 A * 4/1991 | Peck et al. ........... 43/17 |
| 5,050,333 A * 9/1991 | Debreczeni ........... 43/15 |
| 5,056,255 A * 10/1991 | Campbell ............. 43/15 |
| 5,097,618 A * 3/1992 | Stoffel ............... 43/17 |
| 5,119,580 A * 6/1992 | Schulte et al. ......... 248/522 |
| 5,152,093 A * 10/1992 | Bartys ................ 248/520 |

(List continued on next page.)

*Primary Examiner*—Charles T. Jordan
*Assistant Examiner*—Stephen A Holzen
(74) *Attorney, Agent, or Firm*—Alex Rhodes

(57) ABSTRACT

An ice fishing apparatus for automatically jigging a fishing line. The apparatus has two repeating states, an active state wherein said jigging occurs and an inactive state wherein jigging does not occur. In a preferred embodiment, three optional jigging rates are provided. The duration of the active state for each of the jigging rates is about 10.4 seconds and the duration of the inactive state is about 4.2 seconds. The apparatus is comprised of a housing, an arm pivotally mounted to the housing, an alarm, an electric motor drive unit for rotating the arm upwardly and downwardly to jiggle a fishing line, and an electronic control unit. The electronic control unit controls the periods of the active and inactive states, triggers the alarm, increases battery life and prevents damage to an electric motor. The electronic control unit is a CMOS dual monolithic timing IC circuit. An important feature of the invention is that the tension in the fishing line for activating the alarm system can be selectively preset within a given range. Another feature is that the performance of the apparatus is not affected by water.

22 Claims, 6 Drawing Sheets

U.S. PATENT DOCUMENTS

| | | | | |
|---|---|---|---|---|
| 5,157,857 A | * | 10/1992 | Livingston | 43/17.6 |
| 5,228,228 A | * | 7/1993 | Meissner | 43/17 |
| 5,231,784 A | * | 8/1993 | Condusta | 43/17 |
| 5,259,252 A | * | 11/1993 | Kruse et al. | 73/862.391 |
| 5,269,088 A | * | 12/1993 | Slaback et al. | 43/17 |
| 5,274,944 A | * | 1/1994 | Laessig | 43/17 |
| 5,359,802 A | * | 11/1994 | Gutierrez | 43/15 |
| 5,396,726 A | * | 3/1995 | Zepeda, Sr. | 73/17 |
| 5,437,121 A | * | 8/1995 | Chacon et al. | 43/19.2 |
| 5,461,817 A | * | 10/1995 | Flood | 43/19.2 |
| 5,473,835 A | * | 12/1995 | Emett | 43/19.2 |
| 5,495,688 A | * | 3/1996 | Sondej et al. | 43/16 |
| 5,499,469 A | * | 3/1996 | Guillemette | 43/16 |
| 5,535,538 A | * | 7/1996 | Heuke | 43/19.2 |
| 5,540,010 A | * | 7/1996 | Aragona | 43/19.2 |
| 5,570,534 A | * | 11/1996 | Ford | 43/19.2 |
| 5,758,449 A | * | 6/1998 | Munsterman et al. | 43/17 |
| 5,890,312 A | * | 4/1999 | Ball | 43/15 |
| 5,894,691 A | * | 4/1999 | Zepeda, Sr. | 43/17 |
| 5,903,998 A | * | 5/1999 | Hawkins et al. | 43/15 |
| 5,918,407 A | * | 7/1999 | Sebestyen | 43/27.4 |
| 5,930,938 A | * | 8/1999 | De Fraties et al. | 43/15 |
| 5,943,808 A | * | 8/1999 | Bryant | 43/17 |
| 6,009,656 A | * | 1/2000 | Knepp | 43/19.2 |
| 6,035,573 A | * | 3/2000 | Flores | 43/17 |
| 6,088,945 A | * | 7/2000 | Sanderfoot | 126/271.1 |
| 6,158,160 A | * | 12/2000 | Sykes | 43/45 |
| 6,170,189 B1 | * | 1/2001 | Klein | 43/17 |
| 6,220,538 B1 | * | 4/2001 | Durso | 242/250 |

* cited by examiner

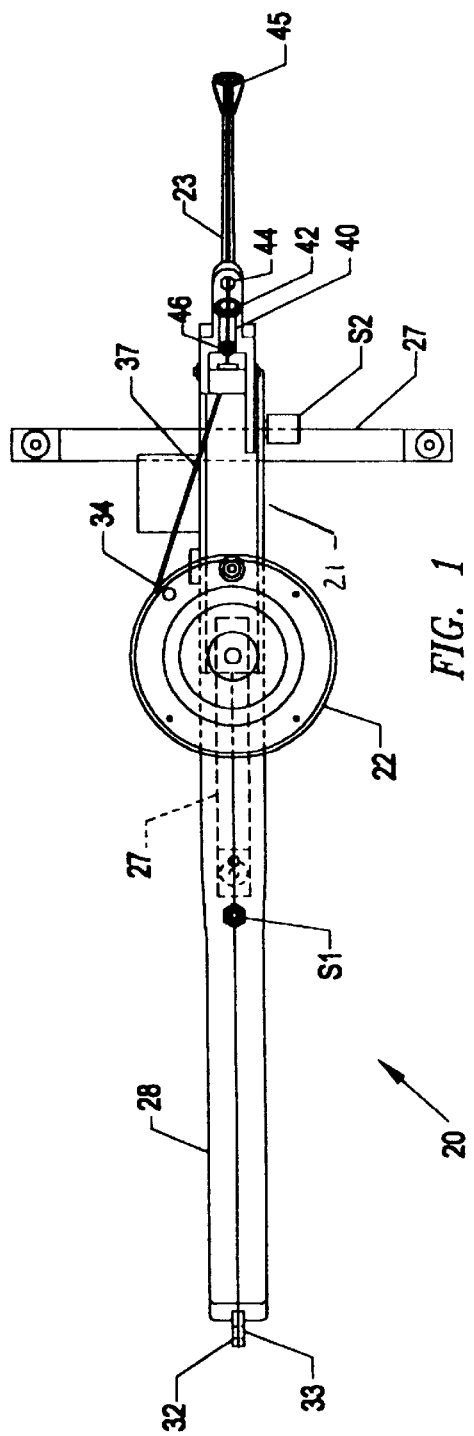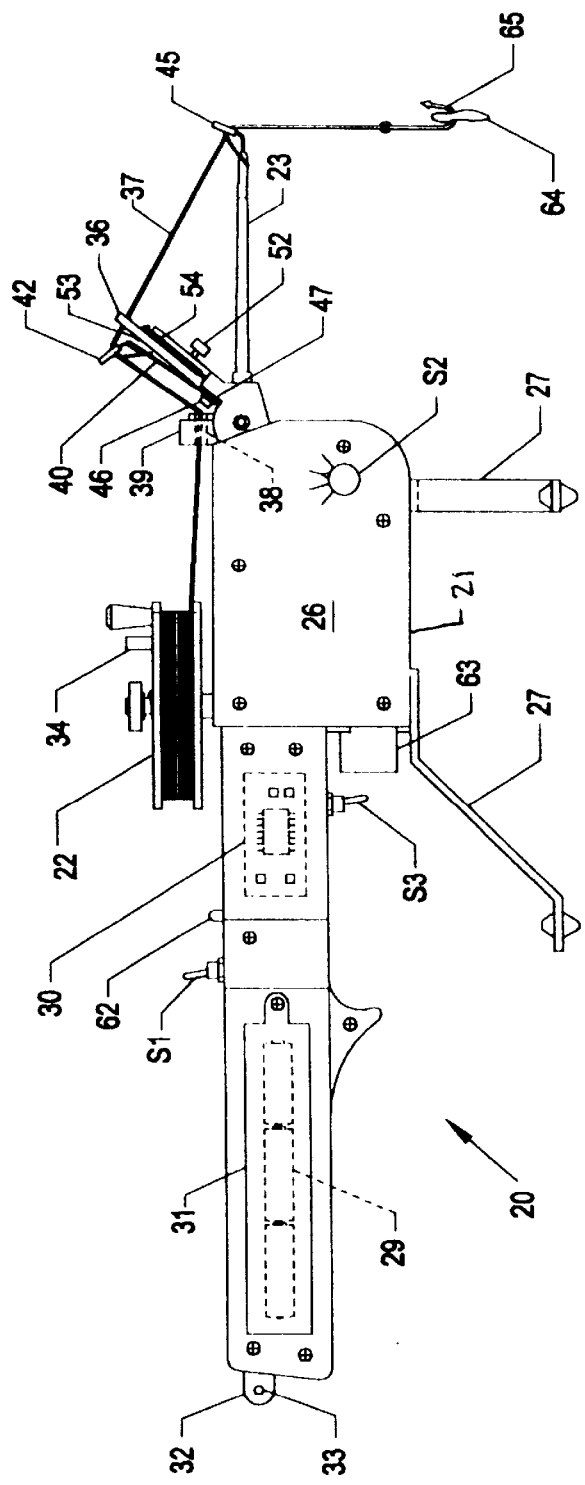

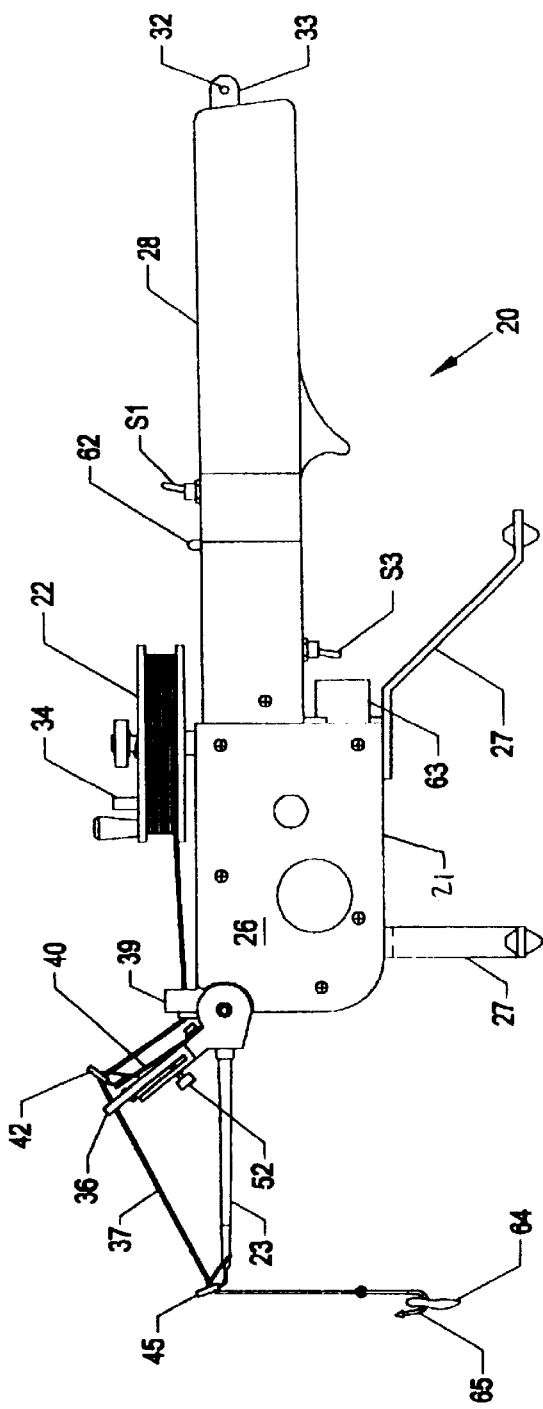
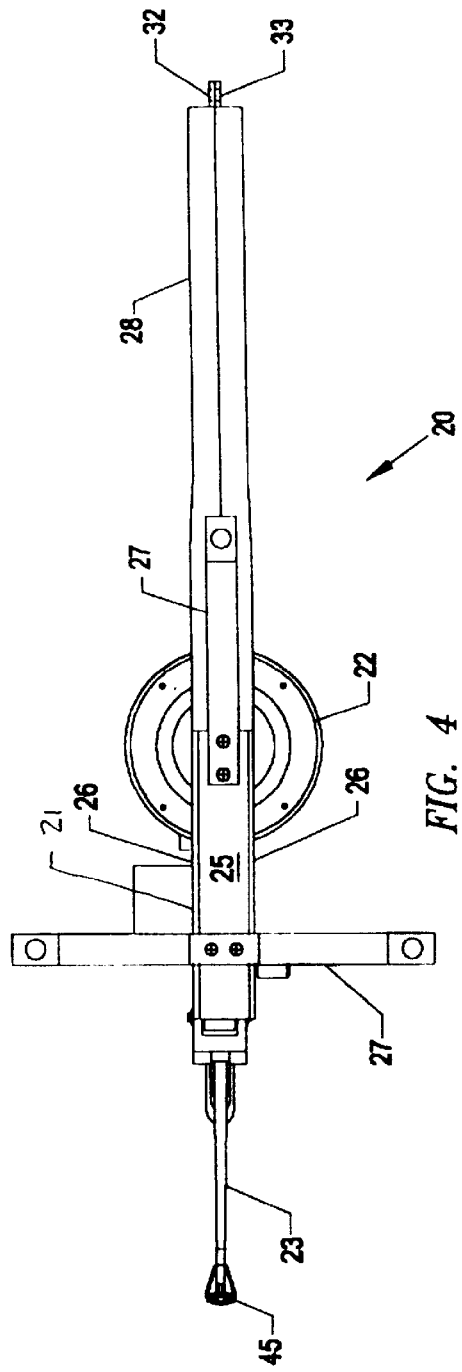
FIG. 3
FIG. 4

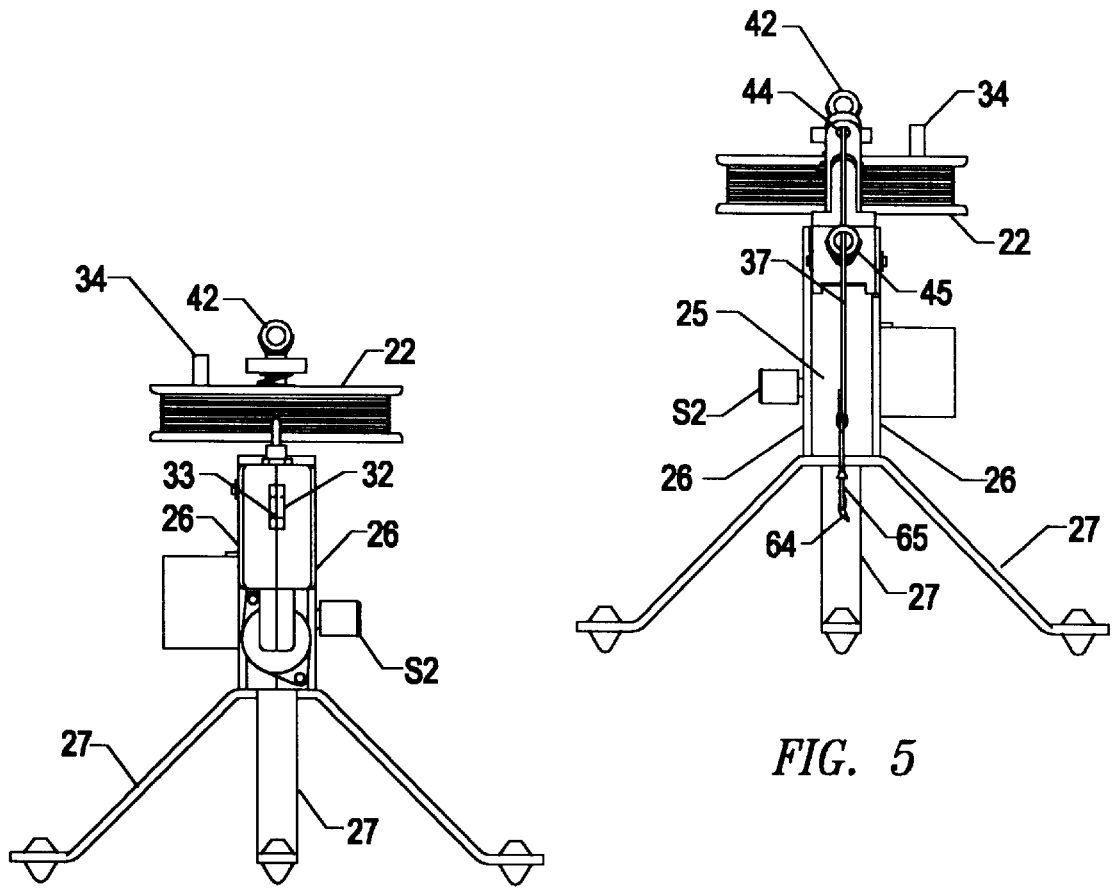
*FIG. 5*
*FIG. 6*
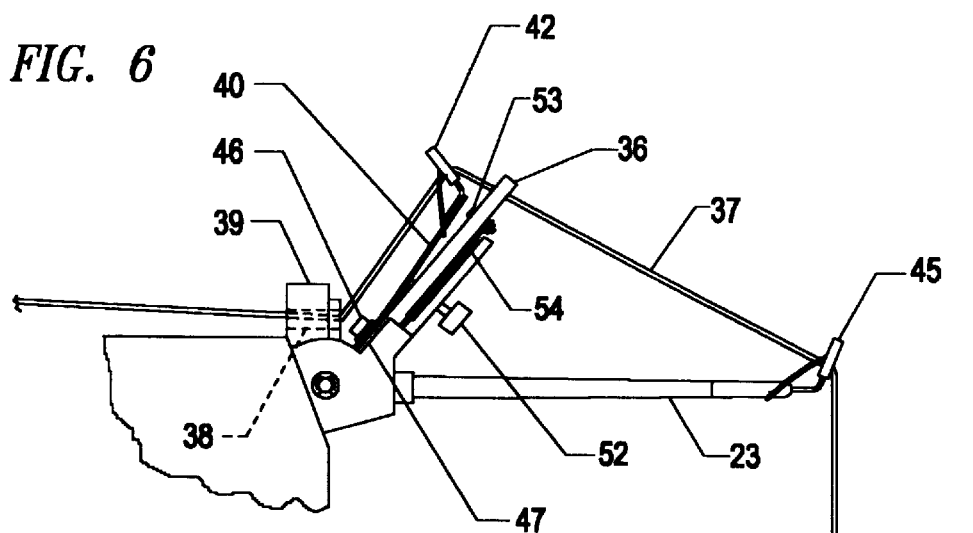
*FIG. 7*
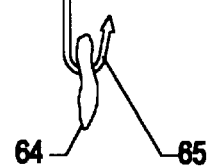

ICE FISHING JIGGING APPARATUS AND METHOD

FIELD OF THE INVENTION

This invention relates to ice fishing equipment and more particularly to an automatic jigging apparatus and method.

BACKGROUND OF THE INVENTION

The usual procedure for fishing through ice is to lower a bait through a hole in the ice and patiently wait for a fish to attack or hook the bait. One aspect of ice fishing is that more than one line is often used. Still yet another aspect is that fishing lines are often left unattended. Some catches are lost because fishermen do not respond in sufficient time when fish attack unattended lines. Still yet another aspect is that the metabolism of fish during cold weather is low. Consequently, fish are sluggish and need to be excited into nibbling or attacking baits. A catch may be lost due to an alarm system which fails to detect a nibble or bite because of a lack of sensitivity. The aspects require unique solutions over warm weather fishing.

One solution is to excite a fish by jigging a fishing line. Jigging generates waves which excite a fish into nibbling or attacking a bait. However, manually jigging of even a single line can be tiring, monotonous and may detract from the joy of fishing. Automatic jigging would overcome these concerns. Another solution is to sound an alarm when a fish nibbles, bites or attacks a bait. However, to be effective, the alarm would have to activated from even a momentary nibble or bite of a bait. It would have to allow a fisherman ample time to respond.

SUMMARY OF THE INVENTION

The present invention provides a means for effectively implementing all of the above solutions. The invention resides in features which individually and collectively contribute to its ability to jiggle multiple fishing lines and warn a fisherman when a fish nibbles, bites or attacks a bait. Moreover, the invention adds to the joy of ice fishing by allowing a fisherman to pursue matters, such as relaxing, eating, cleaning fish and hooking baits while his lines are unattended. Although the invention is particularly directed to ice fishing, many of its features can be adapted for warm weather summer fishing.

The automatic ice fishing apparatus has two repeating states, i.e., an active state where jigging occurs and an inactive state where jigging does not occur. In a preferred embodiment, three jigging rates are provided. The duration of the active state for each of the three jigging rates is about 10.4 seconds and the time duration of the inactive state is about 4.2 seconds. The apparatus is comprised of a housing, an arm pivotally mounted to the housing, an alarm, an electric motor drive unit for rotating the arm upwardly and downwardly, and a CMOSS 7556 dual monolithic electronic control circuit.

The CMOSS 7556 control circuit, which itself is believed to be novel, provides a number of benefits. One benefit of the CMOSS 7556 circuit is that its output is not affected by battery output voltage. Another benefit is that battery life is extended. Another benefit is that the threshold for triggering an alarm can be adjusted for different levels of tension on a fishing line. Another benefit is that when the alarm is automatically triggered, the alarm stays on for a short time even if only momentarily triggered. Still yet another benefit is that an electric motor which drives the jigging is protected against damage from overloads. Still yet another benefit is that the alarm may be operated with live fish bait and the jigging turned off. Still yet another benefit is that the performance of the control system is unaffected by moisture or water.

One feature of the invention is a high sensitivity to nibbles and bites. The sensitivity of the apparatus can be adjusted to detect nibbles and bites which produce a tension in a fishing line as low as 0.5 grams to as high as 0.5 pounds. This feature is beneficial when fishing in streams and bays having high currents. The alarm system, which is comprised of an LED, buzzer and on/off switch, is another feature of the invention. Many fishermen do not want to alert other fishermen when a nibble or bite occurs. The on/off switch prevents only the buzzer from being activated.

Further objects, benefits and features of the invention will become apparent from the ensuing detailed description and drawings which illustrate and describe the invention. The best mode which is contemplated in practicing the invention together with the manner of using the invention are disclosed and the property in which exclusive rights are claimed is set forth in each of a series of numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawing illustrating a presently preferred specific embodiment of the invention by way of non-limiting example only.

FIG. 1 is a plan view of an ice fishing jigging apparatus.

FIG. 2 is a right side view of the jigging apparatus.

FIG. 3 is a left side view of the jigging apparatus.

FIG. 4 is a bottom view of the jigging apparatus.

FIG. 5 is a front view of the jigging apparatus.

FIG. 6 is a rear view of the jigging apparatus.

FIG. 7 is an enlarged partial left side view of the jigging apparatus.

DETAILED DESCRIPTION OF A PREFERRED EMBODIMENT

Figure 8:
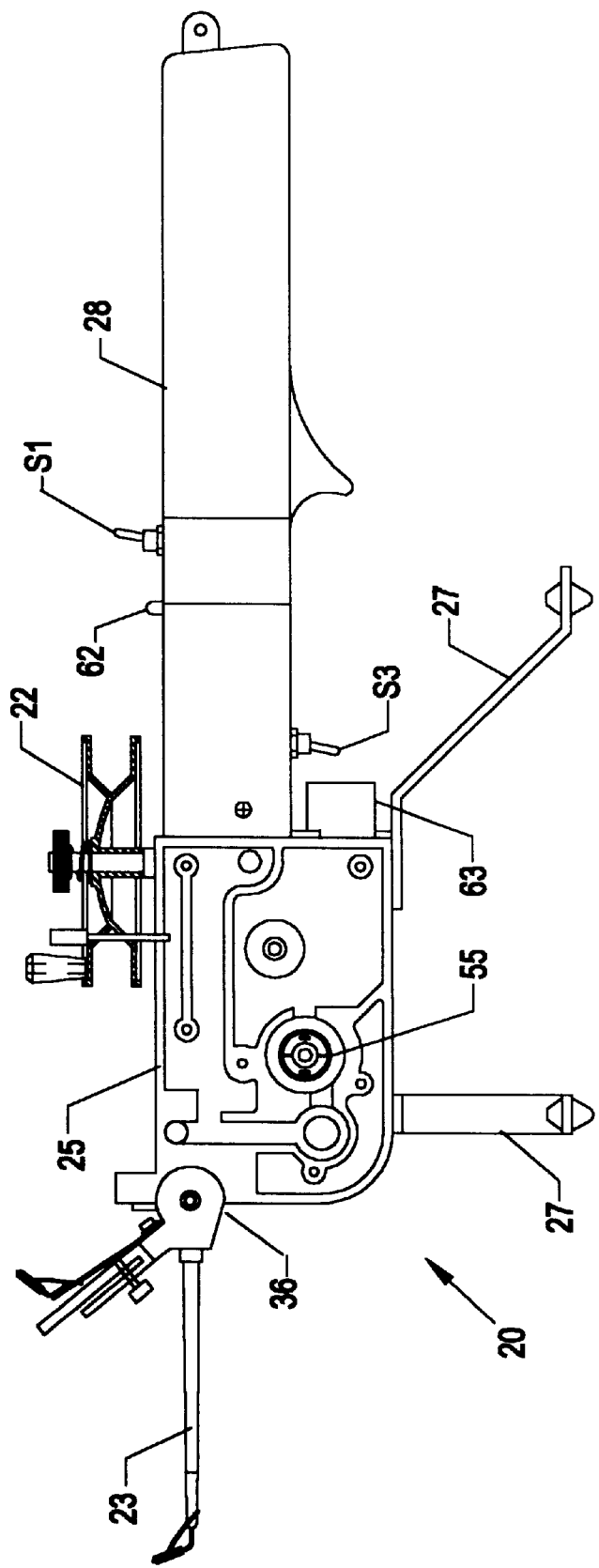
FIG. 8 is a left side view of the jigging apparatus with a cover removed.

Referring now to the drawings wherein like numerals designate like and corresponding parts throughout the several views, an ice fishing jigging apparatus 20 is shown which comprises a housing 21, a reel 22, a slender short pole 23 extending forward of the housing 21 and a control system 24 and drive components in the interior of the housing 21. The housing 21 has a body 25, a handle 28 attached to the rear of the body 21, a pair of removable covers 26 on the sides of the body 25 and legs 27 for supporting the jigging apparatus 20 on ice. The covers 26 are used for assembling and servicing components inside of the housing 21. The handle 28 is a two piece hollow handle 28 for manually holding the jigging apparatus 20. It is also used for storing batteries 29 and a printed circuit (PC) board 30.

On one side of the handle 21 is a cover 31 for replacing batteries 29. At the end of the handle 28 there is a small tab 32 with an aperture 33 for attaching a line (not shown) to anchor the apparatus 20 to a fixed object. A removable vertical pin 34 extends through the reel 22 to lock the reel 22 against rotation during jigging. Extending forward from the housing 21 is a short slender pole 23. The pole 23 is attached to an arm 36 which is pivotally mounted to the body 25 of the housing 21. The arm 36 rotates upwardly and downwardly to jiggle a fishing line 37. The reel 22 rotates about a vertical axis except when reel 22 is locked with pin 34. The fishing line 37 is threaded through an aperture 38 of a boss 39 on the top portion of the body 25 through an eyelet 42 at an end portion of a flat metal spring 40, through an aperture 44 of the arm 36 and finally through an eyelet 45 on the end of the short slender pole 23. The eyelet 42 and eyelet 45 are lined with plastic to prevent damaging the line 37. The upward and downward movement of the arm 36 jiggles the line 37 upwardly and downwardly.

Figure 9:
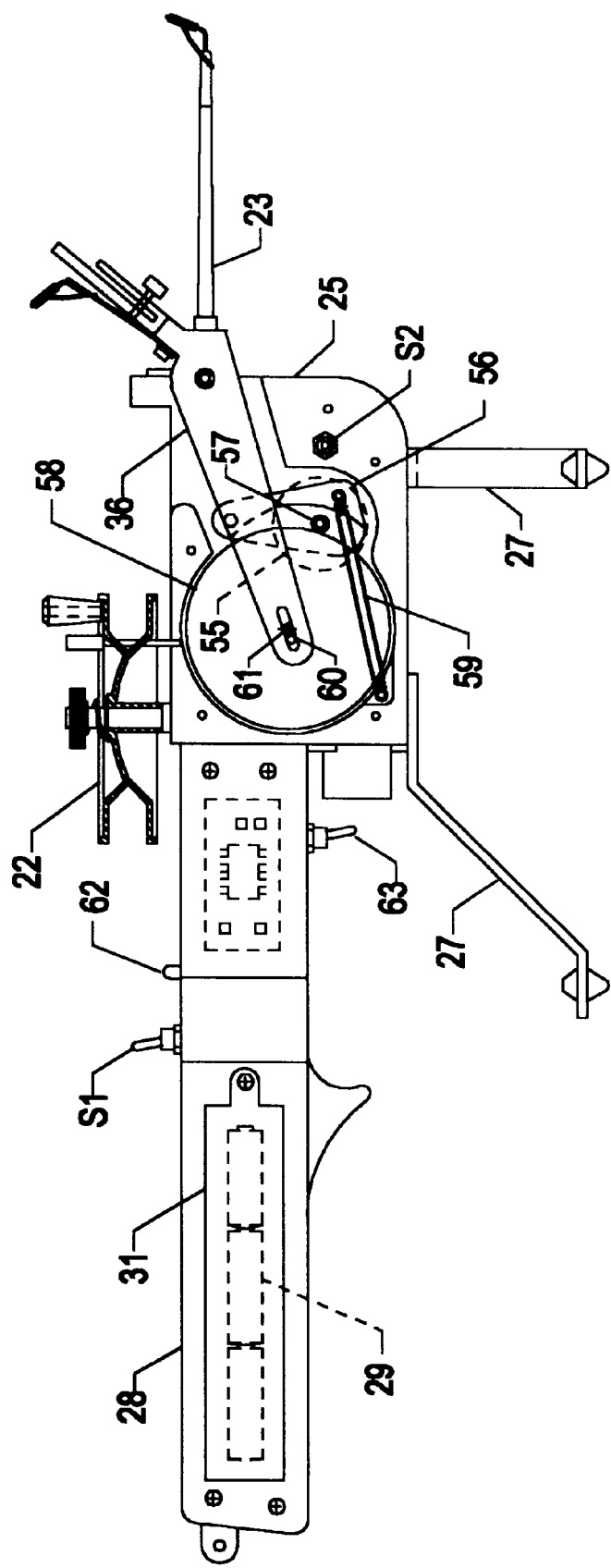
FIG. 9 is a right side view of the jigging apparatus with a cover removed.

The flat metal spring 40 is attached to the arm 36 with a screw 46 and contacts a small diameter wire 47 under the head of the screw 46. The wire 47 is connected to the PC board 30 inside of the handle 28. At the opposite end of the flat spring 40 is an electrical contact 53. The shape of the arm 36 is best seen in FIGS. 7–9. The rear of the arm 36 extends downwardly and rearwardly into the interior of the housing 21 and has a slotted aperture 60. The front of the arm 36 extends upwardly and forwardly of the housing 21. A small screw 52 extends through the arm 36 and contacts the flat metal spring 40. The portion of the arm 36 through which the screw 52 extends is slotted to deflect a portion of arm 36 to maintain the position of the screw 52 in arm 36.

On the front of the arm 36, directly below the metal spring 40, is a small electrical contact 53. The contact 53 is attached to a second wire 54 from the PC board 30. The metal spring 40 and contact 53 form a simple on/off switch S4. Switch S4 closes when the metal spring 40 comes into contact with contact 53. The screw 52 can be adjusted in the arm 36 to deflect spring 40 an amount which requires a tension in the fishing line 37 as low as 0.5 grams to as high as 0.5 pounds to close switch S4. The high sensitivity of S4 is an important feature of the jigging apparatus 20.

Referring now to FIGS. 8 and 9, in the interior of the housing 21 is a small electric motor 55. The motor 55 is attached to a lower portion of an arm 56 which is pivotally attached to the body 25, such that the motor 55 rotates with the arm 56. On an end portion of the motor's output shaft is a neoprene rubber sleeve 57 which contacts a rather large thin cylindrical disk 58 which is mounted for rotation to the housing's body 25. A wire extension spring 59 which extends between the housing's body 25 and pivoting arm 56 presses the neoprene rubber sleeve 57 against the large thin disk 58. On the large disk 58 is a small diameter post 60. The post 60 is spaced a small distance from the center of rotation 61 of the large disk 58 and engages a slotted aperture 50 of the arm 36. The arm 36 and slender pole 23 rotates upwardly and downwardly as the large disk 58 is rotated by the electric motor 55.

Figure 10:
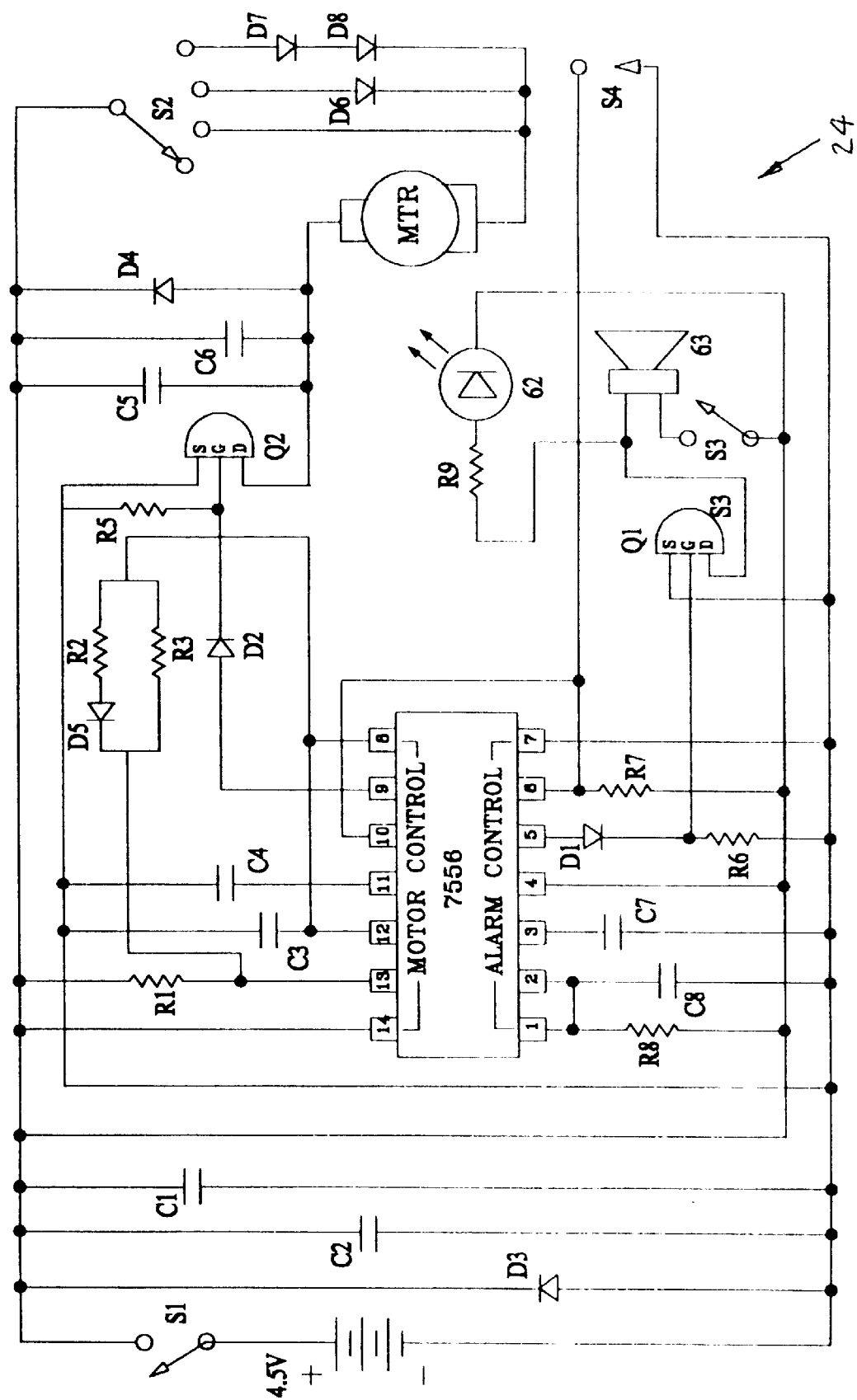
FIG. 10 is a schematic view of an electronic control system for the jigging apparatus.

Referring now to FIGS. 2 and 10, the control circuit is comprised of an "on/off" power switch S1, a jigging frequency and motor "on/off" switch S2, an alarm switch S3, a fish strike switch S4 and a CMOS 7556 dual monolithic timing circuit. One half of the CMOS 7556 dual monolithic timing circuit is used to control the motor 55 and the other half is used to control the light (LED) 62 and piezo buzzer 63. Switches S1, S2 and S3 are mounted on the housing 21. Switch S4 consists of the contact 53 at the end of the arm 36 and the flat spring 40.

When the system is first turned on with switch S1, the rotation of the motor 55 causes the arm 36 to rotate upwardly and downwardly, thereby jigging the fishing line 37. A preferred displacement is about 0.31 inches. In the embodiment described herein there are three possible jogging frequencies, i.e. a low, intermediate and higher frequency. The jigging frequency is determined by the position of switch S2. S2 is a four position rotary switch which turns the motor 55 "on" and "off" and controls the jigging frequency. At the maximum frequency, the full voltage of the power supply is available to the motor 55. At the lowest frequency, the voltage is dropped by 1.4 volts (diodes D7 and D8) and at the intermediate frequency the voltage is dropped by 0.7 volts (diode D6)

Assume that the components of the control system of FIG. 10, have the following values:

R1=15 KΩ
R2=1 MΩ
R3=1.5 MΩ
R7=10K
R8=1 MΩ
C3=10 $\mu$F
C4=0.33 $\mu$F
C8=0.33 $\mu$F

When switch S1 closes and switch S4 is open, the reset line of the motor timer (pin 10) and the trigger input of the light timer (pin 6) are pulled to $V_{bat}$ by R7. Since the system has just been turned on, the timing capacitors C3 and C8 are discharged. The trigger (pin 8) and threshold (pin 12) lines, which are tied together, are low forcing the output of the motor timer (pin 9) to turn on. With pin 9 on, the power FET Q2 turns on, grounding the motor lead, thereby forcing the motor 55 to turn on. As C3 charges through R1+R3, the voltage present at pins 8 and 12 forces the output (and motor) off after approximately 10.4 seconds. Note: The initial motor 55 "on" time is:

$$(R1+R3)C3\times0.693$$

or $$(15000+1500000)\times10\uparrow5\times0.693=10.4 \text{ sec.}$$

If switch S4 closes when a fish nibbles or pulls on the fishing line, switch S4 closes and reset line (pin 10) is tied to ground which forces the timer to a reset state, turning the output (pin 9) and the motor 55 "off". If switch S4 does not close, the motor 55 runs for 10.4 seconds and then turns off. When the output (pin 9) goes off, the discharge line (pin 13) goes low discharging C3 through R2 in parallel with R3. D5 is a steering diode whereby C3 is charged (motor on) through R3 but discharged more quickly by the two resistors (R2 and R3) in parallel. The "off" time of the motor 55 is:

$$C3((R2\times R3)/(R2+R3))0.693=4.2 \text{ seconds.}$$

The motor 55 oscillates "on" and "off" continuously with a 10.4 second "on" time and a 4.2 second "off" time unless switch S4 closes. Any time switch S4 remains closed, the motor 55 remains off.

The second half of the timer controls the LED 62 and the buzzer 63. Unless the output of the timer (pin 5) is "on", both the LED 62 and buzzer 63 remains "off". The FET Q1 is used as the power switch for the timer and buzzer 63. At power up, C8 is discharged, the reset line (pin 4) is pulled high (tied to pin 14) and the trigger line (pin 6) is pulled high through R7 unless switch S4 is closed. When switch S4 closes, the LED 62 and buzzer 63 is turned "on" and remains "on" as long as switch S4 remains closed since the trigger line (pin 6) is tied to ground when this occurs. Once switch S4 opens, the timer's output remains "on" (LED 62 and buzzer 63 "on") until C8 is charged by R8 at which time the timer's output (LED 62 and buzzer 63) turns "off". Therefore the shortest "on" time for the LED 62 and buzzer 63 is:

$$R8 \times C8 \times 0.693 = 0.23 \text{ seconds.}$$

A preferred method for using the jigging apparatus is as follows. The locking pin 34 is depressed to lock the reel 22 against rotation. If an audible signal is not desired, the alarm buzzer 63 is turned "off" with switch S3. After a bait 64 has been installed on the hook 65, the power is turned "on" with switch D1. The motor is turned "on" and the jigging frequency is set with switch S2. The apparatus 20 is lowered to rest on ice, and the bait 64 is lowered through an opening in the ice, into the water by retracting locking pin 34 to allow more fishing line 37 to feed from the reel 22 and depressed to lock the reel 22. During fishing, various jigging rates can be used by re-setting switch S2. When a fish nibbles, bites or attacks the bait, the LED 62 (and buzzer 63 if activated) is activated by tension on the fishing line 37 closing switch S4. If a fish is caught on the line, the jigging apparatus 20 is lifted with the handle 28, the locking pin 34 is retracted and the power is turned off with switch S1. Resistor R7 prevents the conductivity of water from inadvertently shorting switch S4 when the switch S4 is open.

From the foregoing, it will be understood that my invention provides a jigging apparatus having benefits and advantages heretofore unavailable. Although only one embodiment has been illustrated and described, it is not my intention to limit the scope of the claims to this embodiment since other embodiments can be derived by such changes as modifications in the CMOSS 7556 control circuit, changes in the order and number of method steps, elimination of parts, substitution of parts, and substitution of materials without departing from the spirit thereof.

What I claim is new is:

1. A jigging apparatus for warning a fisherman that a fish has contacted or nibbled on a bait on a fishing line comprising: a reel for storing said fishing line; said fishing line stored on said reel; a means for jigging said fishing line, said jigging means having a pattern of two repeating operative states when said apparatus is activated, an active state wherein said jigging occurs and an inactive state following said active state wherein said jigging does not occur; an electronic control system; a selectively adjustable "warning" means for warning a fisherman that a fish has contacted or nibbled on said bait, said warning means having two states, an inactive state wherein said warning means is inactive and said fish has not contacted or nibbled on said bait and an active state wherein said warning means is active to warn said fisherman said fish has contacted or nibbled on said bait; and a means for activating said warning system according to a selected amount of tension in said fishing line when said fish has contacted or nibbled on said bait.

2. The apparatus recited in claim 1 wherein said warning means is an audible buzzer warning means.

3. The apparatus recited in claim 1 wherein said warning means is a visual LED warning means.

4. The apparatus recited in claim 1 wherein said jigging means comprises a pole mounted for rotation in said apparatus for jigging said fishing line by raising and lowering a portion of said fishing line; a non-reversing drive means for raising and lowering said pole, said non-reversing drive means comprising: a motor for rotating a thin cylindrical disk, said motor having a horizontal output shaft; a thin cylindrical disk mounted on said motor's output shaft; a rubber sleeve on said motor's output shaft, said sleeve being in frictional relationship with an outer edge of said thin cylindrical disk for rotating said thin cylindrical disk; a pin mounted on said thin cylindrical disk in spaced apart and parallel relationship to said axis of said motor; and a pivotally mounted arm, said arm having a slotted end portion for engaging said pin and an opposite end portion for attaching an inner end portion of said pole; an electronic means for stopping and starting said motor to produce said active and said inactive jigging states.

5. The apparatus recited in claim 4 wherein said electronic means for stopping and starting said motor is a solid state IC timer circuit.

6. The apparatus recited in claim 5 wherein said solid state IC timer circuit is a dual monolithic CMOSS 7556 timer circuit for extending battery life, preventing motor damage and triggering said warning means at different levels of tension in said fishing line.

7. The apparatus as recited in claim 1 wherein said active jigging state has a duration of about 10.4 seconds and said inactive jigging state has a duration of about 4.2 seconds.

8. The apparatus as recited in claim 1 wherein said active jigging state has a jigging frequency of about 290 cycles per minute.

9. A jigging apparatus for warning a fisherman that a fish has nibbled on a bait on a fishing line comprising: a reel for storing said fishing line; said fishing line stored on said reel; a means for jigging said fishing line; and a warning means, said warning means comprising a flexible means for closing an electrical circuit to activate a light or a buzzer to warn a fisherman that a fish has nibbled on a bait on said fishing line, said flexible means being selectively adjustable to activate said light or said buzzer when a tension as low as one gram is in said fishing line when said fish nibbles on said bait and moves said fishing line against said flexible contact to close said electrical circuit.

10. A jigging apparatus for warning a fisherman that a fish has nibbled on a bait on a fishing line comprising: a housing: a reel for storing said fishing line attached to said housing; said fishing line stored on said reel; an arm mounted for rotation upwardly and downwardly in said housing, said arm having a slotted aperture at an end portion of said arm, a pole attached to said arm for rotation upwardly and downwardly with said arm; an electric motor having a horizontal output shaft; a battery for driving said electric motor; a non-reversing means connected to said motor for rotating said arm and said pole upwardly and downwardly; said rotating means comprising, a thin cylindrical disk mounted for rotation in said housing, a rubber sleeve mounted on said output shaft of said motor, said rubber sleeve in frictional engaging relationship with a circumferential surface of said cylindrical disk for rotating said cylindrical disk; a small diameter post mounted on said disk for engaging said slotted aperture of said arm, said post spaced a small distance apart from a center of rotation of said disk for said rotating of said arm and said pole; an alarm system, said alarm system being selectively adjustable to activate said alarm system at different amounts of tension in said fishing line when said fish has nibbled on a bait attached to said line; and an electronic control system for controlling a rate of said jigging and for operating said alarm system.

11. The apparatus recited in claim 10 wherein said alarm system is comprised of an audible means and a visual means for warning said fisherman.

12. The apparatus recited in claim 10 wherein said electronic control system includes an electronic means for preventing water from adversely affecting the operation of said jigging apparatus.

13. The apparatus recited in claim 10 wherein said electronic control system includes a means for providing more than one jigging frequency.

14. The apparatus recited in claim 10 wherein said electronic control system includes a CMOSS 7556 circuit for extending battery life.

15. The apparatus recited in claim 10 wherein said apparatus has two repeating jigging states, an active state wherein jigging occurs and an inactive state wherein jigging does not occur.

16. The apparatus recited in claim 1 wherein said warning system is activated when said selected amount of tension in said fishing line caused by said fish contacting or nibbling on said bait is less than one gram.

17. The apparatus recited in claim 1 wherein said means for activating said warning system includes a normally open circuit and is operable when said selected amount of minimum tension in said fishing line caused by said fish nibbling on said bait is about 0.5 grams.

18. A method for automatically jigging an ice fishing line comprising the steps of: locking a fishing reel against rotation in a jigging apparatus; adjusting a member in said jigging apparatus to activate an alarm system at a selected amount tension in a fishing line is within a range of values; closing an on/off switch of said apparatus to begin jigging said fishing line; jigging said fishing line for a period of about 10.4 seconds; stopping said jigging for a period of about 4.2 seconds; and automatically repeating said starting and said stopping of said jigging.

19. The method recited in claim 18 further comprising the step of opening said on/off switch to terminate said jigging.

20. The method recited in claim 18 wherein said range of values of said tension is from about 0.5 grams to 0.5 pounds.

21. A jigging apparatus for warning a fisherman that a fish has contacted or nibbled on a bait on a fishing line comprising: a reel for storing said fishing line; said fishing line stored on said reel; a means for jigging said fishing line, said jigging means having two repeating operative states, an active state wherein said jigging occurs for about 10.2 seconds and an inactive state wherein said jigging does not occur for about 4.2 seconds, said jigging means comprising: a pole mounted for rotation in said apparatus for jigging said fishing line by raising and lowering a portion of said fishing line; a non-reversing drive means for said raising and said lowering of said fishing line; an alarm for informing a fisherman that a fish has contacted or nibbled on said bait on said fishing a solid state IC circuit for generating said active and said inactive states, and triggering said alarm when said fish has contacted or nibbled on said bait on said fishing line; and a means for activating said alarm when said fish has contacted or nibbled on said bait on said fishing line.

22. A jigging apparatus for warning a fisherman that a fish has contacted or nibbled on a bait on a fishing line comprising: a reel for storing said fishing line; said fishing line stored on said reel; a means for jigging said fishing line, said jigging means having two repeating operative states, an active state with a jigging frequency of about 290 cycles per minute wherein said jigging occurs and an inactive state wherein said jigging does not occur; and a means for warning a fisherman that a fish has contacted or nibbled on said bait on said fishing line, said warning means being selectively adjustable to warn a fisherman at a selected amount of tension in said fishing line that said fish has contacted or nibbled on said bait; and a means for activating said warning system when said tension is as low as 0.5 grams.

* * * * *